United States Patent [19]

Röck

[11] Patent Number: 5,041,273

[45] Date of Patent: Aug. 20, 1991

[54] PROCESS FOR THE REDUCTION OF THE EMISSION OF SULPHUR DIOXIDE AND/OR OF OXIDES OF NITROGEN IN COMBUSTION PROCESSES

[75] Inventor: Heinrich Röck, Trostberg, Fed. Rep. of Germany

[73] Assignee: SKW Trostberg Aktiengesellschaft, Trostberg, Fed. Rep. of Germany

[21] Appl. No.: 379,495

[22] Filed: Jul. 13, 1989

[30] Foreign Application Priority Data

Jul. 14, 1988 [DE] Fed. Rep. of Germany ....... 3823848

[51] Int. Cl.$^5$ .................. B01J 8/00; C01B 21/00; C01B 17/00

[52] U.S. Cl. .................................. 423/239; 423/235; 423/244

[58] Field of Search ............. 423/235, 235 D, 239 A, 423/239, 244 R, 244 A

[56] References Cited

U.S. PATENT DOCUMENTS 4,770,863  9/1988  Epperly et al. ................. 423/235

FOREIGN PATENT DOCUMENTS 2926107  1/1981  Fed. Rep. of Germany .
3447616  7/1985  Fed. Rep. of Germany .

*Primary Examiner*—Gregory A. Heller
*Attorney, Agent, or Firm*—Felfe & Lynch

[57] ABSTRACT

The present invention provides a process for reducing the emission of sulphur dioxide and/or of oxides of nitrogen in combustion processes, wherein hydrate calcium cyanamide is used as additive, degrees of denitration of 40 to 50% and degrees of desulphurization of 70 to 80% thereby being achieved.

10 Claims, No Drawings

PROCESS FOR THE REDUCTION OF THE EMISSION OF SULPHUR DIOXIDE AND/OR OF OXIDES OF NITROGEN IN COMBUSTION PROCESSES

The present invention is concerned with a process for the reduction of emissions of sulphur dioxide and/or of oxides of nitrogen in combustion processes.

It is known that emissions of oxides of sulphur and nitrogen arising in the case of the combustion of fossil fuels can be considerably reduced by the addition of certain additives.

In the case of the denitration of flue gases, technically catalytic processes have proved to be particularly useful but they give rise to certain technical problems because of the large space requirement for the catalyst masses. Therefore, as an alternative, non-catalytic nitrogen oxide reduction processes have been developed, ammonia having been used technically because of its selective action. A disadvantage in the case of using ammonia is the difficulty of handling it, together with particular safety measures necessary, for which reason this processes requires a large technical expenditure.

For the reduction of emissions of sulphur dioxide, for example from power plant boilers, as is known, alkaline earth metal oxides have been used technically these being added either directly or being formed during the waste gas treatment from hydroxides or carbonates. The nature of the addition varies in the case of the individual lime additive processes: the addition of the additive can take place in dry or in moist form.

A disadvantage of all of these processes is the fact that desulfurization and denitration of the waste gases must be carried out separately, i.e. in several stages.

Hitherto, only a few processes have become known in which, by the use of one additive, a simultaneous reduction of the emissions of oxides of sulphur and nitrogen from combustion processes can be achieved.

Thus, in published Federal Republic of Germany Patent Specification No. 34 47 616, a process is described according to which a calcium-containing compound, for example calcium carbonate, calcium oxide, calcium carbide and diamide lime, is used in admixture with calcium cyanamide as dry additive for the simultaneous desulfurization and denitration of waste gases. Technical calcium cyanamide is a very hard and coarse grained material which can only be pulverized by laborious grinding and which is comparatively inert. This is especially problematical in the case of the use thereof as a dry additive where a relatively high rate of reaction is necessary.

Therefore, it is an object of the present invention to develop a process for the reduction of emissions of sulphur dioxide and/or of oxides of nitrogen in the case of combustion processes which does not display the above-mentioned disadvantages of the state of the art but rather makes possible, with a low technical expenditure, an effective reduction of emissions of sulphur dioxide and of oxides of nitrogen in one step.

Thus, according to the present invention, there is provided a process for the reduction of emissions of sulphur dioxide and/or of oxides of nitrogen in combustion processes, wherein hydrated calcium cyanamide is used as additive.

Surprisingly, we have found that calcium cyanamide in hydrated form possesses an especially high reactivity towards harmful acidic materials from combustion processes and that it is possible to manage with comparatively small amounts of additive.

In the process according to the present invention, as additive there is used hydrated calcium cyanamide which has been produced by the reaction of technical calcium cyanamide with an approximately equivalent amount of water at ambient temperature or at an elevated temperature. The hydrated calcium cyanamide is preferably produced by treatment with water vapor at a temperature of up to 400° C.

The hydrated calcium cyanamide, which preferably consists of 40 to 50% by weight calcium cyanamide, 15 to 25% by weight calcium hydroxide, 10 to 12% by weight carbon, as well as 1 to 10% by weight calcium carbonate, is thereby present as an amorphous, soft and extremely fine-grained product which is also characterised by an especially good flowability. The particle size of the hydrated calcium cyanamide is preferably <160 μm. for 90% of the particles.

In the scope of the present invention, it is possible additionally to add to the additive up to 50% by weight of a reactive calcium compound, referred to the content of hydrated calcium cyanamide. As reactive calcium compounds are to be understood those compounds which, on the basis of their reactivity, are able to bind sulphur dioxide and/or oxides of nitrogen. Compounds such as calcium carbonate, calcium hydroxide and calcium oxide have thereby proved to be especially useful. Calcium carbonate can thereby be used not only as synthetic product but also in the form of limestone. The modification of the component in question is of lesser importance, whereas the fineness thereof is of more importance. Black lime, which consists essentially of calcium carbonate and carbon and is obtained as a by-product in the large-scale production of cyanamide derivatives, has thereby proved to be especially advantageous.

A typical black lime is thereby diamide lime which consists of about 70 to 85% by weight of very fine, precipitated calcium carbonate and 8 to 12% by weight of carbon in graphitic modification and also small amounts of oxidic impurities. Results which are similarly good to those obtained with diamide lime can be achieved with calcium hydroxide which is also obtained in very finely divided form by the hydration of calcined lime (CaO). Therefore, according to the present invention, there is preferably used a mixture of reactive calcium compounds with hydrated calcium cyanamide.

These calcium compounds intensify especially the desulfurizing effect of the hydrated calcium cyanamide and, therefore, are preferably used in those combustion processes in which the emission of sulphur dioxide is especially great.

The process according to the present invention is especially effective in the temperature range of from 800° to 1200° C. and can thus be used without problems in practically all combustion plants and especially in power plant boilers.

The addition of the additive is also without problems since, on the basis of its fine state of division and flowability, it can be blown as dry additive very simply with the help of a carrier gas into the combustion chamber, possibly with the fuel or into the particular combustion planes. As carrier gases, there can thereby be used the combustion air or other gases which behave in an inert manner and do not enter into any undesired side reactions. In a preferred embodiment, as carrier gas there is used water vapor which is blown into the combustion process together with the additive.

We have hereby found that, with the help of the water vapor, a further activation of the hydrated calcium cyanamide takes place so that an especially high reduction of the harmful materials can be achieved. A similar good effect can be achieved when the additive in the form of an aqueous suspension is sprayed in, preferably into the hot combustion waste gases, with the help of conventional nozzles. In this way, too, due to the evaporating water, a special activation of the additive takes place. It is thereby decisive to provide for a spraying of the droplets which is as fine as possible and for a uniform distribution of the additive in the waste gas stream, which can be accomplished without problems with conventional technical devices.

The amount of additive necessary for the reduction of the emission of oxides of sulphur and nitrogen depends essentially upon the concentration of harmful materials in the fuel and can, consequently, be varied within wide limits. In the case of conventional combustion plants and especially of power plants, which, depending upon the capacity, fuel and operating conditions, emit between 200 and 1300 mg. of oxides of nitrogen, as well as between 2000 and 5000 mg. of sulphur dioxide per $N_m{}^3$, there are normally necessary from 10 to 100 kg. of additive per ton of fuel in order to achieve a degree of denitration of 40 to 50% and a degree of desulfurization of 70 to 80%. On the basis of the cost-favorable additives which are available on a large scale, as well as on the basis of the low technical expense, the process according to the present invention is outstandingly useful for large-scale operations.

The following Examples are given for the purpose of illustrating the present invention:

EXAMPLE 1

In a power plant of 80 MW capacity fired with lignite, about 35 tons of lignite are burned per hour, an amount of waste gas of 290,000 $Nm^3$/hour thereby resulting. The oxygen content in the waste gas is about 3%, the content of oxides of nitrogen is 950 mg./$Nm^3$ and the content of sulphur dioxide is 2100 mg./$Nm^3$.

Hydrated calcium cyanamide (particle size 90% <160 μm.) is blown in an amount of about 2500 kg./hour with the secondary air into the waste gas (combustion chamber temperature about 1000° C.). The content of oxides of nitrogen is thereby reduced to 460 mg./$Nm^3$ and that of the sulphur dioxide content to 620 mg./$Nm^3$ in the waste gas, which corresponds to a degree of denitration of about 50% and to a degree of desulfurization of about 70%.

EXAMPLE 2

In a power plant of 130 MW capacity are burned 45 tons/hour of hard coal, an amount of waste gas of 300,000 $Nm^3$/hour thereby resulting. The oxygen content in the waste gas amounts to about 6%, the content of oxides of nitrogen to 1250 mg./$Nm^3$ and the content of sulphur dioxide to 2400 mg./$Nm^3$.

Hydrated calcium cyanamide (particle size 90% <160 μm.) is blown with the secondary air in an amount of about 3200 kg./hour into the waste gas (combustion chamber temperature about 1200° C.). The content of oxides of nitrogen in the waste gas is thereby reduced to 650 mg./$Nm^3$ and the content of sulphur dioxide to 750 mg./$Nm^3$, which corresponds to a degree of denitration of about 48% and to a degree of desulfurization of about 77%.

I claim:

1. The method of reducing the emission of sulfur dioxide and oxides of nitrogen in combustion processes, which comprises adding hydrated calcium cyanamide to the waste gases at a temperature of 800° to 1200° C. in an amount of 10 to 100 kg per ton of fuel.

2. The method of claim 1, wherein the hydrated calcium cyanamide consists of 40 to 50% by weight of calcium cyanamide, 15 to 25% by weight of calcium hydroxide, 10 to 12% by weight of carbon, and 1 to 10% by weight of calcium carbonate.

3. The method of claim 1, wherein the hydrated calcium cyanamide has a particle size such that 90% of the particles have a size of <160 μm.

4. The method of claim 1, wherein up to 50% by weight of a reactive calcium compound, based on the amount of hydrated calcium cyanamide, is also added to the waste gases.

5. The method of claim 4, wherein the reactive calcium compound is diamide lime.

6. The method of claim 4, wherein the reactive calcium compound is calcium hydroxide.

7. The method of claim 1, wherein the hydrated calcium cyanamide is blown into the combustion process with the help of a carrier gas.

8. The method of claim 7, wherein said carrier gas is the combustion air.

9. The method of claim 7, wherein said carrier gas is water vapor.

10. The method of claim 1, wherein hydrated calcium cyanamide is sprayed into the hot waste gases in the form of an aqueous suspension.

* * * * *